United States Patent [19]
Watson

[11] Patent Number: 5,596,843
[45] Date of Patent: Jan. 28, 1997

[54] RIGID STRUCTURAL MEMBERS AND STRUCTURES FOR BUILDINGS AND RETAINING MEANS FOR SECURING SHEETS THERETO

[76] Inventor: Robert L. Watson, P.O. Box 30, Lot 20, Concession 5, North Elmsley Township, Rideau Ferry, Ontario, Canada, K0G 1W0

[21] Appl. No.: 395,489

[22] Filed: Feb. 27, 1995

[51] Int. Cl.⁶ .................................................. E04B 1/344
[52] U.S. Cl. ........................... 52/71; 52/63; 52/64; 52/70; 52/222; 52/464; 52/717.03; 52/717.05; 52/730.4; 52/731.2; 52/731.3; 52/731.5; 24/297
[58] Field of Search ........................ 52/63, 64, 70, 52/71, 79.5, 86, 222, 730.1, 730.4, 731.1–731.5, 731.7–731.9, 732.1, 732.2, 645, 646, 461, 463, 464, 717.03, 717.05, 312, 704; 135/121, 907, 119; 24/453, 297

[56] References Cited

U.S. PATENT DOCUMENTS

| | | | |
|---|---|---|---|
| 378,977 | 3/1888 | Ryan | 52/71 X |
| 3,370,389 | 2/1968 | Macaluso | 52/731.5 X |
| 3,490,800 | 1/1970 | Wissler | 52/731.3 X |
| 4,065,904 | 1/1978 | Taylor | 52/731.5 |
| 4,071,990 | 2/1978 | Traber | 52/222 X |
| 4,364,216 | 12/1982 | Koller | 52/731.3 |
| 4,841,688 | 6/1989 | Rinaldi | 52/63 |
| 4,926,591 | 5/1990 | Buijs | 52/63 |
| 4,926,605 | 5/1990 | Milliken et al. | 52/63 |
| 5,224,306 | 7/1993 | Cramer | 52/63 |

FOREIGN PATENT DOCUMENTS 2750351  5/1979  Germany ................. 52/731.3

*Primary Examiner*—Robert Canfield
*Attorney, Agent, or Firm*—Thomas Adams & Assoc.

[57] ABSTRACT

A rigid structural member for a building in which the member has four sides each provided with a groove having narrow opening. Two of the grooves on two opposite sides be used to assemble structural members together to provide completed building assemblies by the use of screw-threaded members while, in the completed assembly, the other two grooves are used for holding two building enclosure sheets in spaced positions, one on each side of the completed assembly. For this purpose, elongate holding members are located in the grooves to hold the sheets in place. The holding members have a particular design which secures them in place within the grooves. The grooves are preferably T-shaped and are all of the same size and shape to increase the versatility. In addition, the structural member may be formed into building structures which are hinged together such that they may be in a collapsed condition for storage and transportation or may be relatively pivoted into an erected condition.

20 Claims, 14 Drawing Sheets

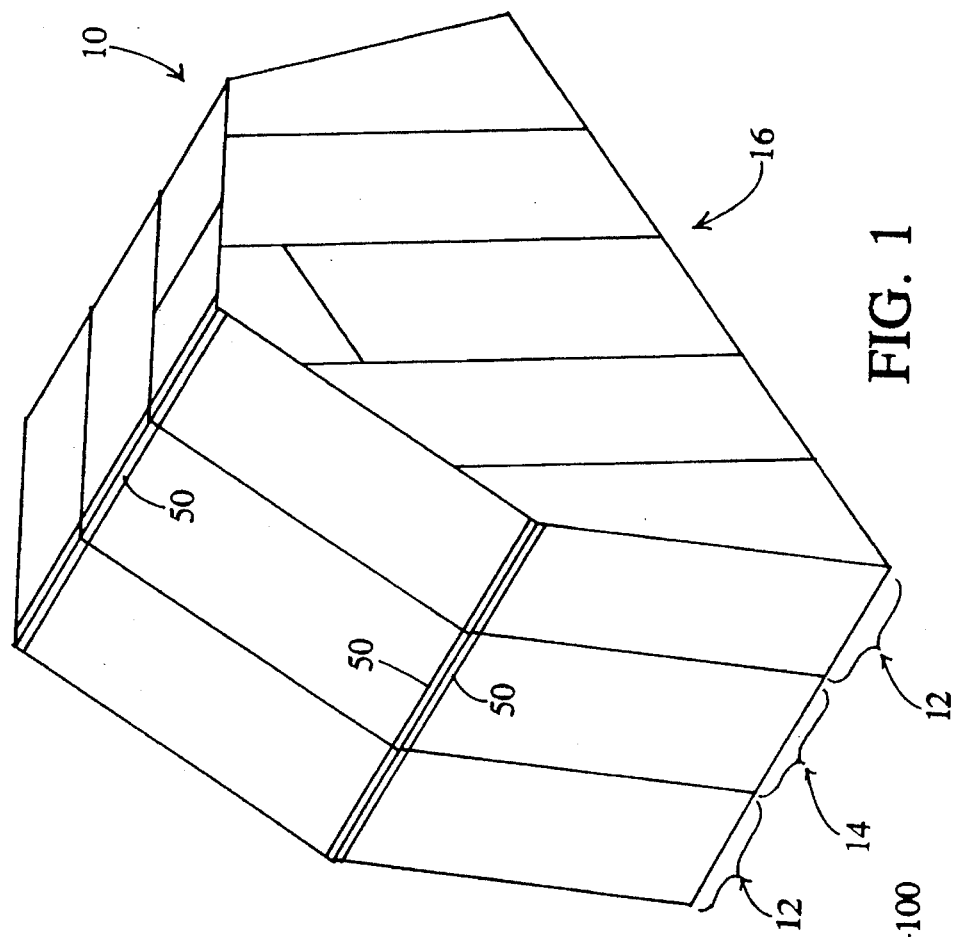
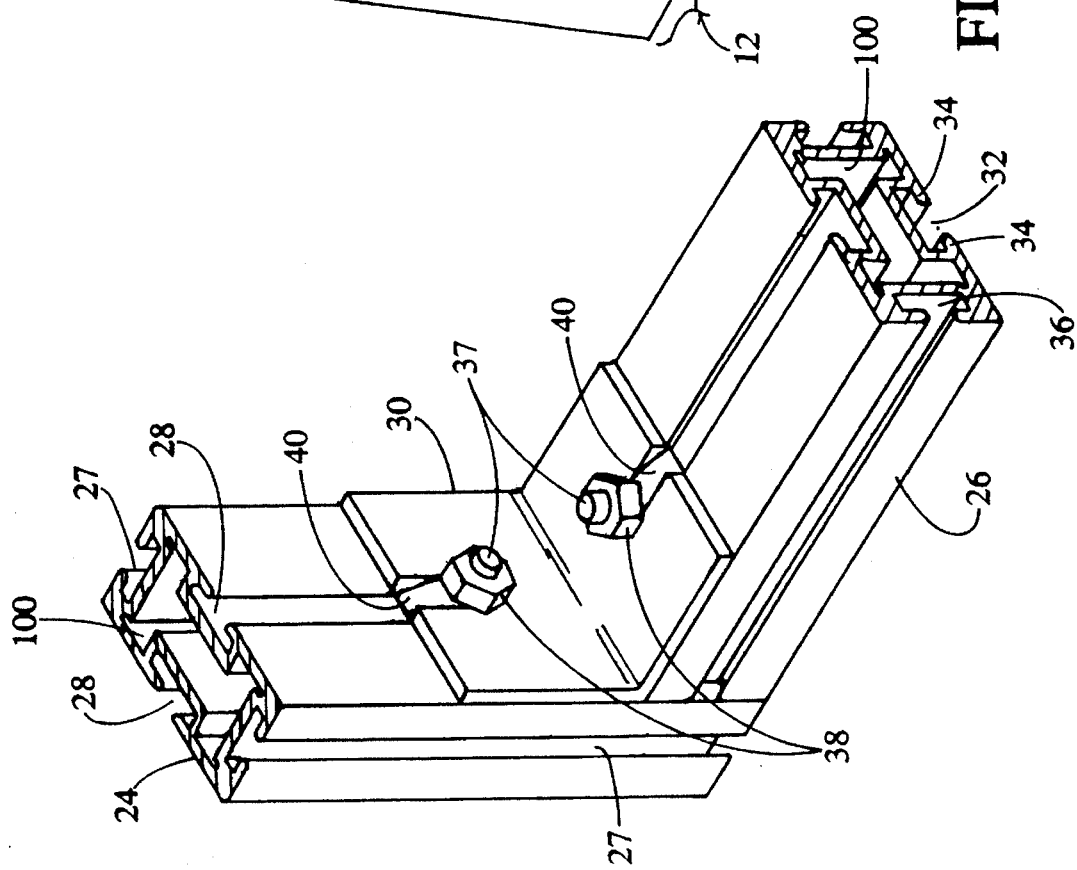

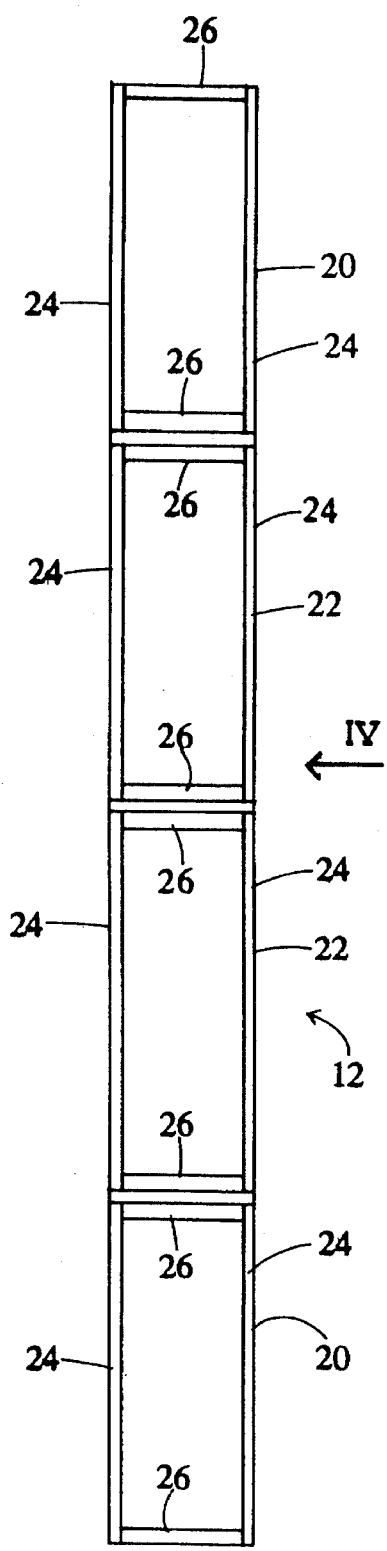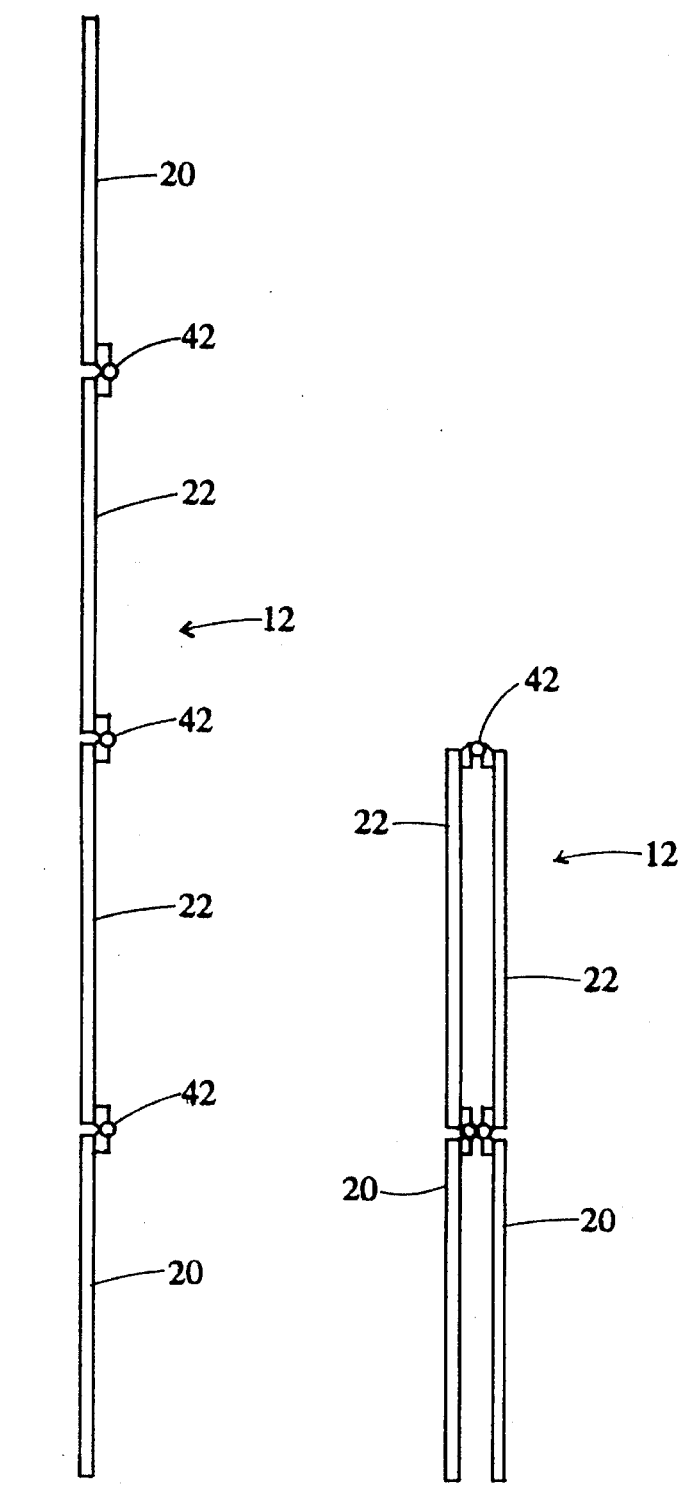
FIG. 3  FIG. 4  FIG. 5

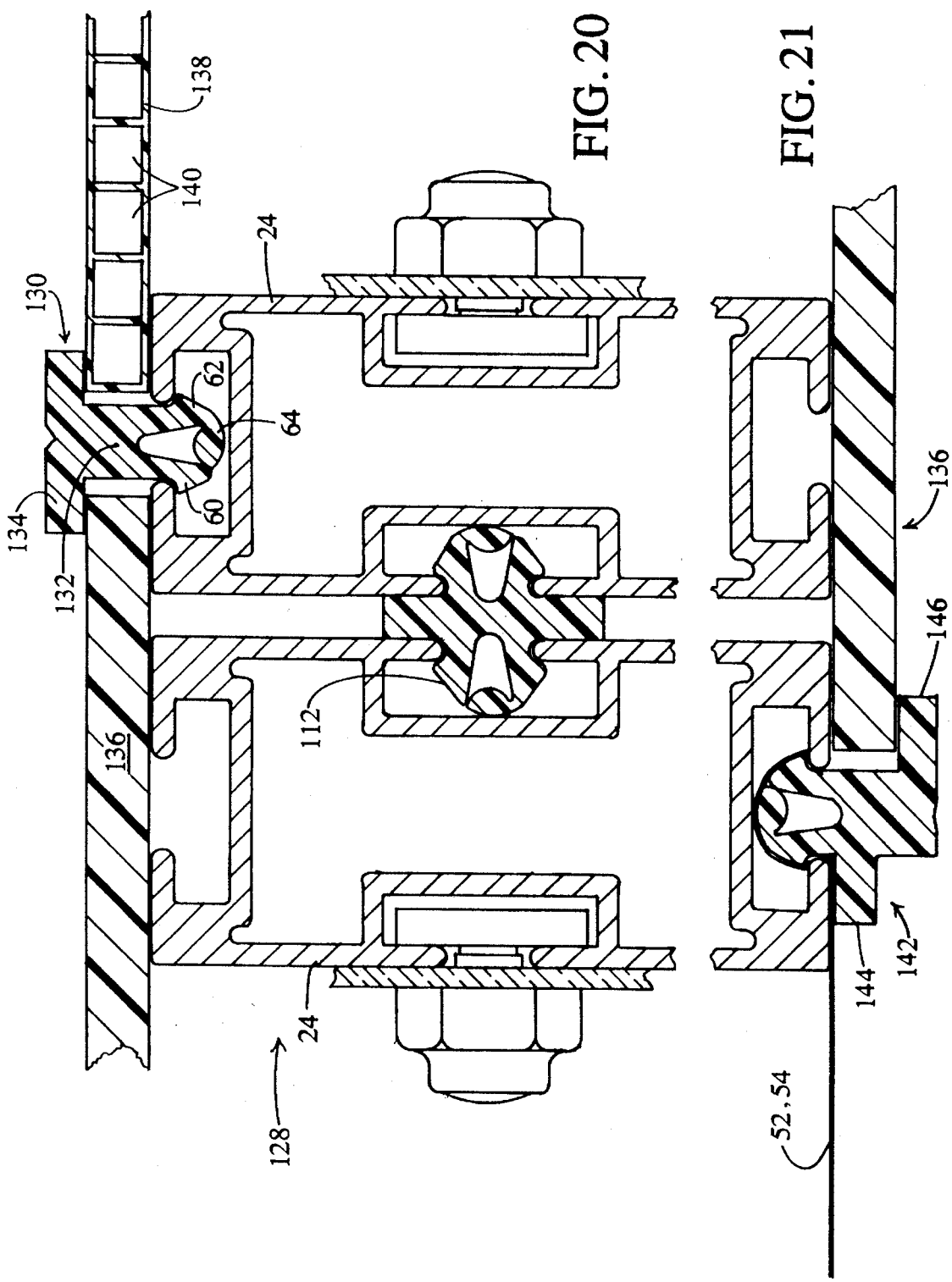

RIGID STRUCTURAL MEMBERS AND STRUCTURES FOR BUILDINGS AND RETAINING MEANS FOR SECURING SHEETS THERETO

TECHNICAL FIELD

This invention relates to rigid structural members and structures for buildings.

BACKGROUND ART

Building structures are known having rigid structural members which are spaced apart to support enclosure sheets for the buildings. The enclosure sheets may be panels extending between structural members, but other sheets such as transparent sheets for greenhouses, are used. In some cases, the enclosure sheets are provided by transparent flexible sheet material extending from structural member to structural member. Such arrangements are shown in various patent specifications. For instance in EP A 0106920, a building canopy system is shown comprising hollow sleeves of polyethylene or polyester which are fastened by their edges to beam sections supported by upright columns and the space within the sleeves needs to be pressurized. The structural members are each provided with concrete foundations to support them separately in the building structure.

A similar type of arrangement is described in U.S. Pat. No. 5,210,983 which discloses a greenhouse which has two spaced apart enclosure sheets of polyethylene foil supported by a structure comprising uprights interconnected by steel wires.

A further structure for supporting two spaced apart enclosure sheets is described in U.S. Pat. No. 4,665,670. The structure requires a clamp to have both enclosure sheets clamped at the same location and because of this closeness of the sheets at the clamping position, air pressurization is required between them to hold them apart so as to provide the benefits of dual insulation. Of interest also are U.S. Pat. Nos. 5,076,033, 5,044,131 and 5,224,306, each of which relates to a single covering sheet extending across rigid supports. In U.S. Pat. Nos. 5,044,131 and 5,076,033 the enclosure sheet material needs to be assembled to the structural members simultaneously with erection of the structure itself.

None of the above described patent specifications is concerned with structural members for buildings which enable a completed structure to be made cheaply, simply and quickly and in finished form before enclosing the structure with two enclosure sheets spaced apart in face-to-face relationship. In addition to this, the above described structures tend to be overly complex—and a varied amount of parts are required to make a building.

SUMMARY OF THE INVENTION

The present invention seeks to provide a structural member and a structure for buildings which is economically attractive, allows for ease of construction, and is in completely assembled condition before two spaced apart enclosure sheets are secured to it.

Accordingly the present invention provides an elongate rigid structural member having four sides each of which is formed with a groove extending longitudinally of the member, the member also having lip means defining a narrow opening to each of the grooves.

In use of the structural members according to the invention, two of the grooves, that is two grooves formed in two oppositely facing sides, are usable as sheet retaining grooves to hold sheet holding members for the purpose of retaining two enclosure sheets extending in face-to-face spaced relationship, one each side of the structural member. The sheets need not terminate at the structural member, but may continue from side to side across it and extend to other structural members in a building construction. As the sheets are held in spaced positions on opposite sides of the structural member, they stay spaced apart as they extend between structural members without the need for air pressurization between them. In the structural member according to the invention, the remaining two grooves are usable for accepting bracing or securing means extending between rigid structural members to hold them in position in an assembled condition of a building.

Preferably the grooves of the structural member are of similar cross sectional shape and have substantially equal dimensions in cross section. With this arrangement, each of the grooves will accept suitably formed bracing or securing means and also will accept sheet holding members for retaining the two enclosure sheets. In a preferred arrangement, each of the grooves is T-shaped for receiving the shank and head of retaining bolts of the securing or bracing means.

The invention also includes the structural assembly for a building having two wall structures and two roof structures. Each structure comprises two main elongate side structural members of the construction defined above, these main members being located at sides of the structure and held spaced apart by secondary elongate rigid structural members extending between and secured to the main structural members. In each of the structures of the assembly, two of the grooves of each main member face from two oppositely facing sides of the structure to provide sheet retaining grooves as defined above for retaining two flexible enclosure sheets extending in face-to-face relationship across the two opposite sides of the structure. The structures of the assembly are hinged together in series with the two wall structures at ends of the series and separated by the two roof structures and the structures are relatively movable about hinge positions between an erected state of the assembly and a collapsed planar state.

Such structural assemblies according to the invention may be pre-built and shipped to a building site for building construction. For storage and shipping purposes clearly a structural assembly would be preferred in the collapsed state so as to occupy a minimum amount of space. In the collapsed state the structures in the assembly may be in a single plane or may be folded about a hinge at a medial position so that the two roof structures confront and are adjacent to each other and the two wall structures are similarly relatively positioned. A building may thus be constructed from such structural assemblies thereby simplifying the constructional operation and reducing the time spent in the construction.

In a structural assembly according to the invention, with the rigid structural members having four sides and formed with grooves on each of its sides, it is possible and preferable to have each of the main and secondary structural members with the same cross sectional size and shape so that a single design of structural member may be used throughout the construction of the structural assembly and possibly therefore throughout the whole of the building construction which is to follow. It thus minimises the basic design of the parts of the structural assembly and of the building itself.

In the use of the structural member or structural assembly according to the invention it is advantageous to employ sheet holding members for location within the grooves in which each sheet holding member has a base and two legs extending in laterally spaced relationship to the base. These legs are relatively flexibly movable towards each other or apart with one of the legs having a locking free end portion which is flexible upon its associated leg, and in a normal unstressed position, is inclined in a direction generally towards the other leg. Upon the legs being inserted into a groove for holding an enclosure sheet in position, the locking free end portion engages a surface of the groove to cause the deflection of the locking free end portion from its normal position and to apply pressure to the other leg so as to hold the legs apart thereby locking the legs in position within the groove.

Various objects, features, aspects and advantages of the present invention will become more apparent from the following detailed description, taken in conjunction with the accompanying drawings, of preferred embodiments of the invention, which are described by way of example only.

BRIEF DESCRIPTION OF THE DRAWINGS

FIG. 1 is an isometric diagrammatic representation of a structural assembly for a building of a first embodiment in the form of a greenhouse formed from rigid structural members;

FIG. 2 is an isometric view, to a much larger scale, showing a structural feature of the greenhouse;

FIG. 3 is a diagrammatic plan view of a structural assembly for the greenhouse, of the first embodiment, the assembly shown in one collapsed condition;

FIG. 4 is a side view in the direction of arrow IV in FIG. 3 of the collapsed assembly;

FIG. 5 is a view similar to FIG. 4 showing the assembly in a different state of collapse;

FIG. 6b is a cross-sectional view taken along line VI—VI of the structure in FIG. 6a;

FIG. 20 is a partial sectional view, similar to FIG. 15, of a fourth embodiment;

FIG. 21 is a partial sectional view similar to FIG. 15, of a modification of the fourth embodiment;

SPECIFIC DESCRIPTION OF THE PREFERRED EMBODIMENTS

Figure 6A:
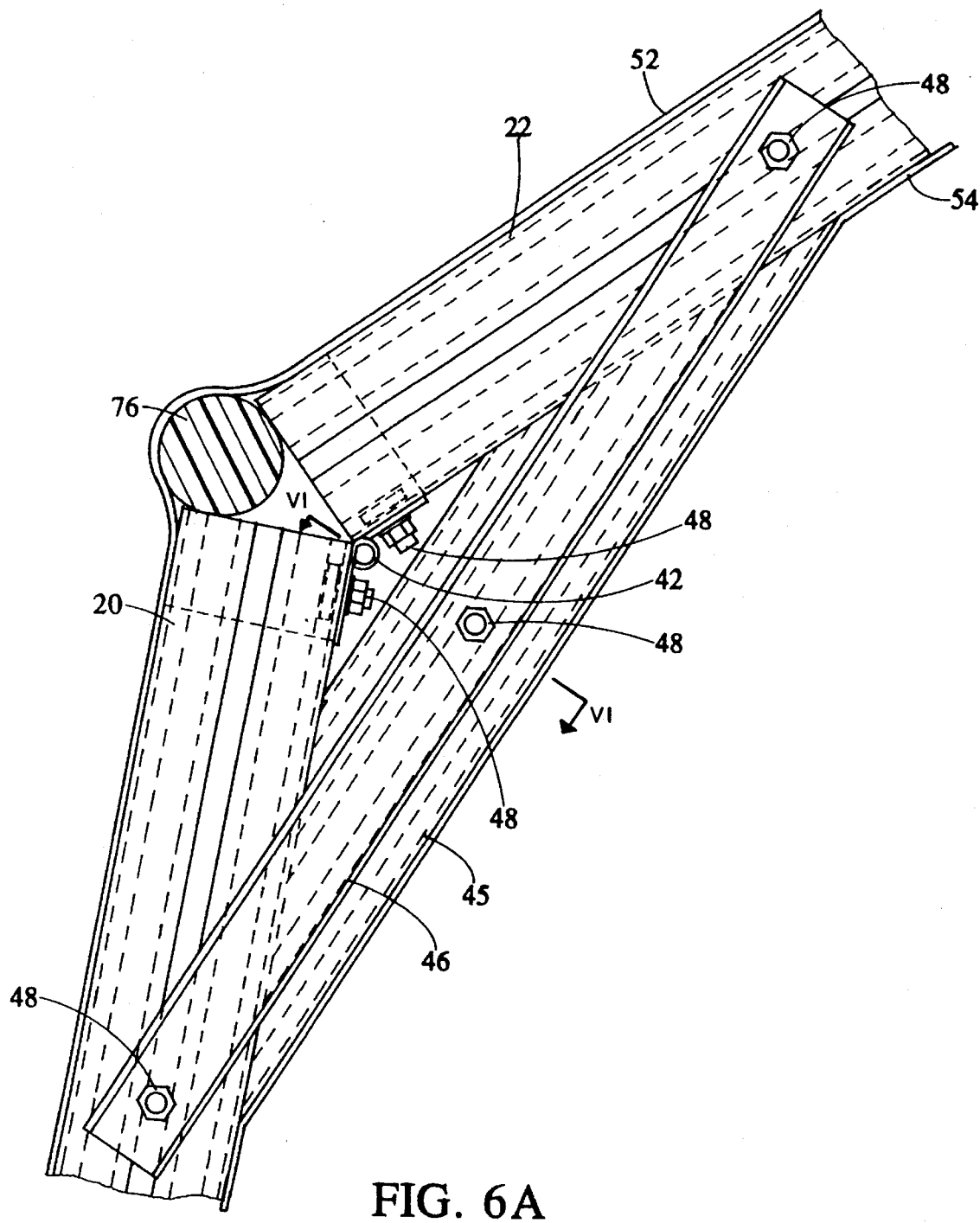
FIG. 6a, to a larger scale, is a detailed side view of an eave part of the structural assembly in erected condition.

In a first embodiment shown by FIG. 1, a greenhouse 10 has sides and a roof formed partly by two structural assemblies 12. These assemblies 12 are spaced apart by a central section 14 of the greenhouse structure and each of the assemblies 12 lies adjacent to a front or rear end of the greenhouse, such as front end 16 (rear end not shown).

As shown by FIG. 3, each of the assemblies 12 is constructed from two rectangular wall structures 20 which lie in series with two rectangular roof structures 22, the roof structures 22 lying between the two wall structures 20. Each of the structures 20 and 22 is constructed with two main elongate rigid side structural members 24 located at the sides of the assembly 12. The two main structural members 24 are held in spaced positions by two secondary elongate rigid members 26 extending between the ends of the structural members 24. Each of the main and secondary structural members 24 and 26 is of rectangular cross section so as to have four sides. Structural members 24 and 26 are preferably formed by extrusion from aluminum or any other suitable material, such as rigid plastics. Structural members 24, 26 are of the same cross sectional size and shape.

As shown in FIG. 2 each of the structural members 24 and 26 is formed with four grooves, one in each of the four sides. Two of these grooves 27 in each of the members are formed in a pair of opposite sides and are provided for holding sheet holding members (to be described) for holding to the structure, inner and outer spaced apart enclosure sheets of plastic material for completing the greenhouse. The other two slots 28 of each of the members 24 and 26 are provided for connecting bracing or securing means for the purpose of securing the structural members together. As shown by FIG. 2, each of the structural members 24 is connected to an end of its associated secondary structural member 26 by securing means comprising an L-shaped bracket 30 the legs of which are secured to members 24 and 26 by screw-threaded means extending into the slots 28 which face inwardly of the assembly.

As shown, each of the grooves 27 and 28 is of the same shape and size in cross section and is of T-shape. Each groove has a narrow opening 32 which is formed by two lips 34 of the member 24 or 26, the narrow opening 32 forming the leg of a T-shape, the base of the T-shape being provided by a base portion 36 of the groove. Thus each groove 27 or 28 is shaped to accommodate the head of a bolt 37 of the screw threaded means for the brackets 30, and as shown in FIG. 2, nuts 38 are received by the bolts. The head of each bolt 37 is of such a size that it may slide along a groove 27 or 28, but is not allowed to rotate. As shown by FIG. 2, the brackets 30 are formed with pressed-out central regions 40 at the free ends of their legs and these pressed out regions 40 lie within the narrow opening 32 of the grooves for correct location purposes.

Figure 6B:
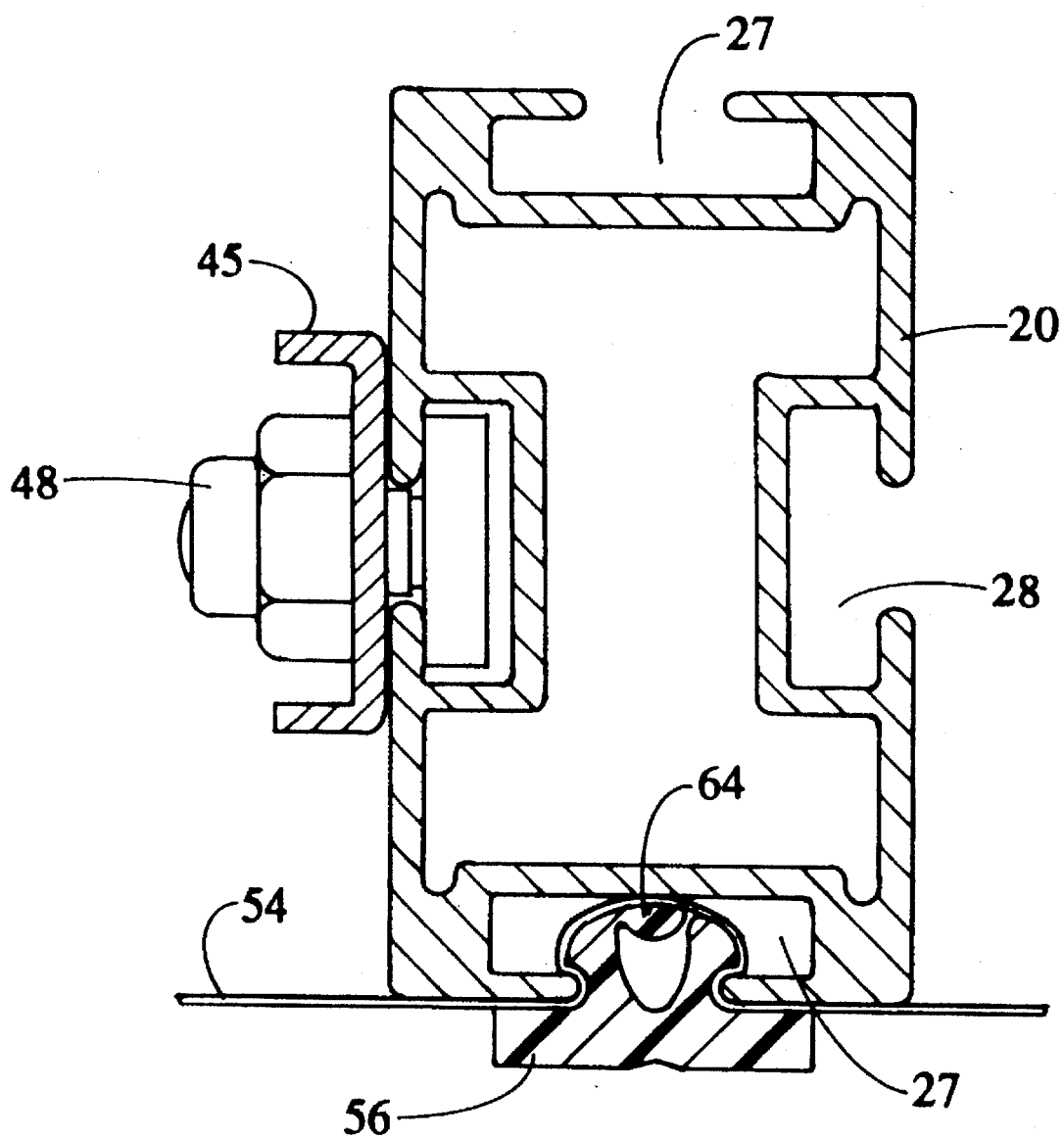
Figure 7:
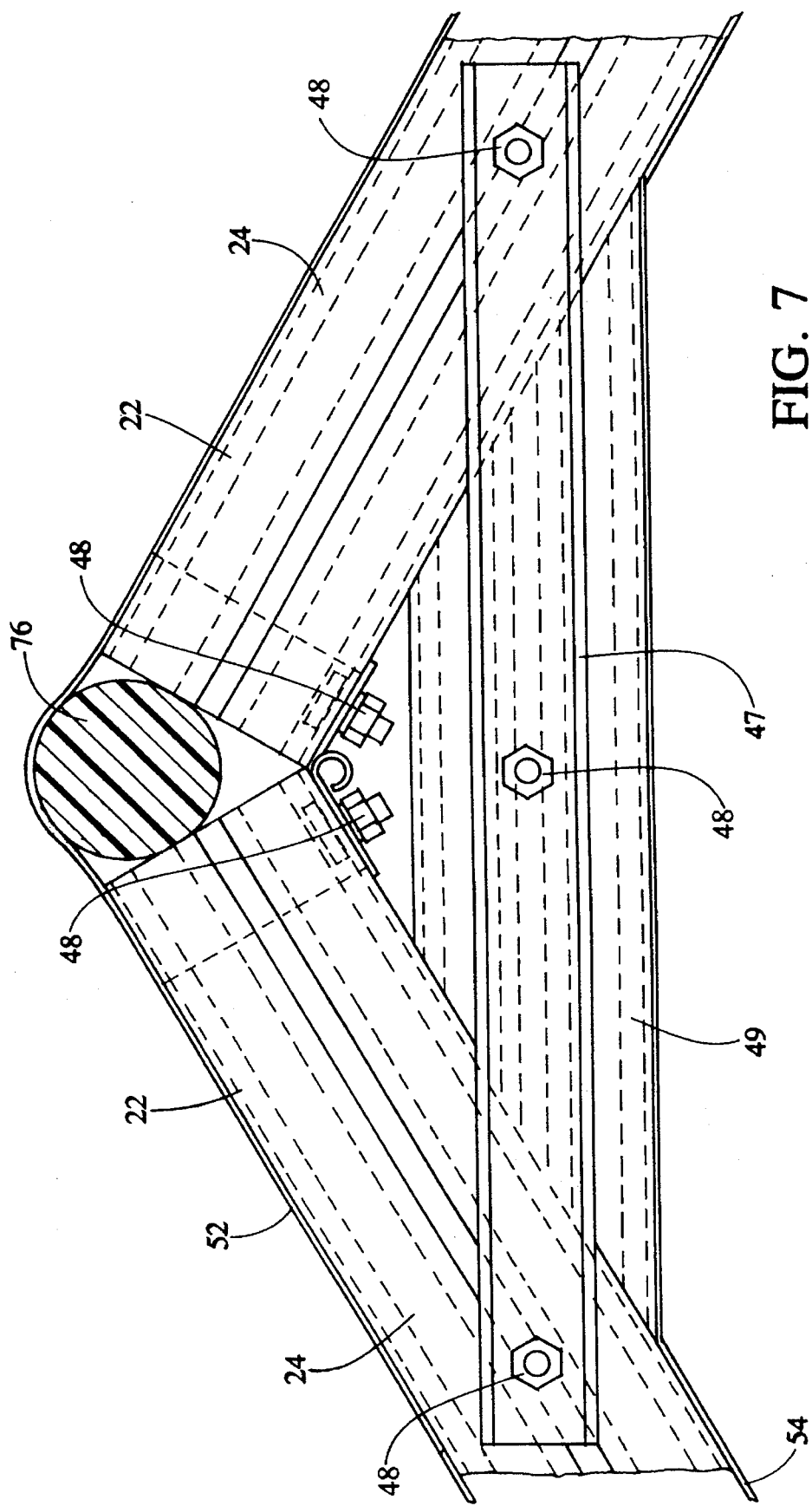
FIG. 7 is a view similar to FIG. 6a of a ridge part of the assembly in erected condition.

As shown in larger detail in FIGS. 6 and 7, the structures 20 and 22 are hinged together in series by hinges 42 which extend from side to side of the assembly 12 and are held in position to adjacent secondary members 26 of adjacent structures 20 and 22 by nut and bolt assemblies 48 with the bolt heads received within appropriate grooves 27 of the member 26. Structural assembly 12 may therefore be collapsed into a flat planar condition as shown in FIGS. 3 and 4 in which all of the structures 20 and 22 lie in a single plane, or it may be collapsed into a semi-folded condition as shown in FIG. 5 in which the roof structures 22 and the wall structures 20 face each other. The collapsed condition is useful for minimizing the space requirements for storage and also for shipping purposes to a building site for a greenhouse.

To construct the greenhouse using the two structural assemblies 12, each of the assemblies is moved from its collapsed to an erected condition in which the two wall structures 20 extend in an inclined fashion as shown in FIG. 1 with the roof structures 22 spanning between them. Each structure is then held in its correct erected position by the use of bracing means shown in FIGS. 6a, 6b and 7. As shown by FIG. 6a, each of the wall structures 20 will be held in its correct angular position to its adjacent roof structure 22, at an eave of the structure, by a bracing means comprising a rigid brace member 46 which is of U-shape in section. The brace member 46 is secured by its ends to one side of each of the adjacent main structural members 24 of the adjacent structures by further nut and bolt assemblies 48 with the heads of the bolts received within the appropriate grooves 28 of the structural members. To provide continuity along each brace member 46 between the grooves 27 which face inwards of associated assemblies 12 (for a reason shortly to be described), a bridging structural member 45 is employed. The member 45 has the same cross-sectional shape as the structural members 24 being formed with grooves 27 and 28 (FIG. 6b). The member 45 has tapered ends so that it abuts against the inwardly facing surface of its associated structural members 24 while lying parallel to the associated brace member 46 (FIG. 6a) to which it is secured by a nut and bolt assembly 48 (FIG. 6b). Brace members 47 also of U-shape in section, but perhaps of different dimensions from the brace members 46, are used to secure together, in their correct angular positions, in a ridge of the structure, the two roof structures 22, as shown by FIG. 7, also by nut and bolt assemblies 48 received within the appropriate grooves 28 of the two structures. A bridging structural member 49 (similar in use to the member 45 in FIGS. 6a, 6b) and of the same cross-sectional shape as the structural members 24 provides continuity between the inwardly facing grooves 27 in the ridge region while being secured to each brace member 47 by nut and bolt assemblies 48. A section through a brace member 47 and its structural member 49 is similar to the view of FIG. 6b.

The two structural assemblies 12 are then joined together in their spaced positions in the greenhouse structure by secondary structural members 50 spanning between the assemblies 12 across central section 14 (see FIG. 1). The members 50 are of the same cross sectional shape and size as the members 24 and 26. The members 50 are secured to the main structural members (in a manner not shown) by the use of other brackets 30 secured to the grooves 28 of the main structural members on the opposite sides of the members from those used for securing to the secondary members 24. The side walls and roof of the greenhouse structure are then in condition completely assembled rigidly in place preparatory to laying two enclosure sheets, one on the inside and one on the outside of the structure, to provide a double glazing effect. The structure is built in such a way that a single outside enclosure sheet 52 and a single inside enclosure sheet 54 may be used to cover the whole of the structure with the sheets in spaced positions (e.g. see FIGS. 8 an 10). Alternatively, two or more sheets may be used on each side with the sheets being overlapped at holding positions i.e. within the grooves 27 of the main and secondary members. A plurality of sheet holding members are provided for holding each of the sheets in position.

Figure 11:
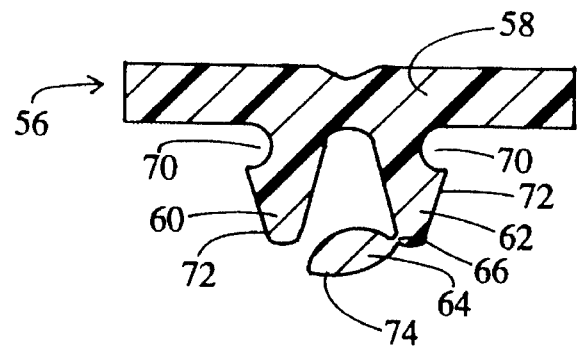
FIG. 11 is a cross sectional view through a sheet holding member in normal unstressed condition.
Figure 12:
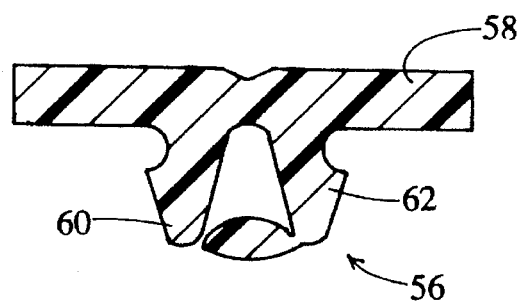
FIG. 12 is a view similar to FIG. 11 and showing the sheet holding member in stressed locking condition such as when inserted within a groove.

Each sheet holding member 56 (FIG. 11) is formed from a suitable resiliently flexible extruded plastic material and comprises a flat planar base 58 from one side of which extend two legs 60 and 62. In the normal unstressed condition the legs 60 and 62 diverge slightly from the base. The leg 62 is provided with a locking free end portion 64 which is flexibly held to its leg 62 by a narrow neck 66 with the locking end free portion being substantially rigid.

Figure 8:
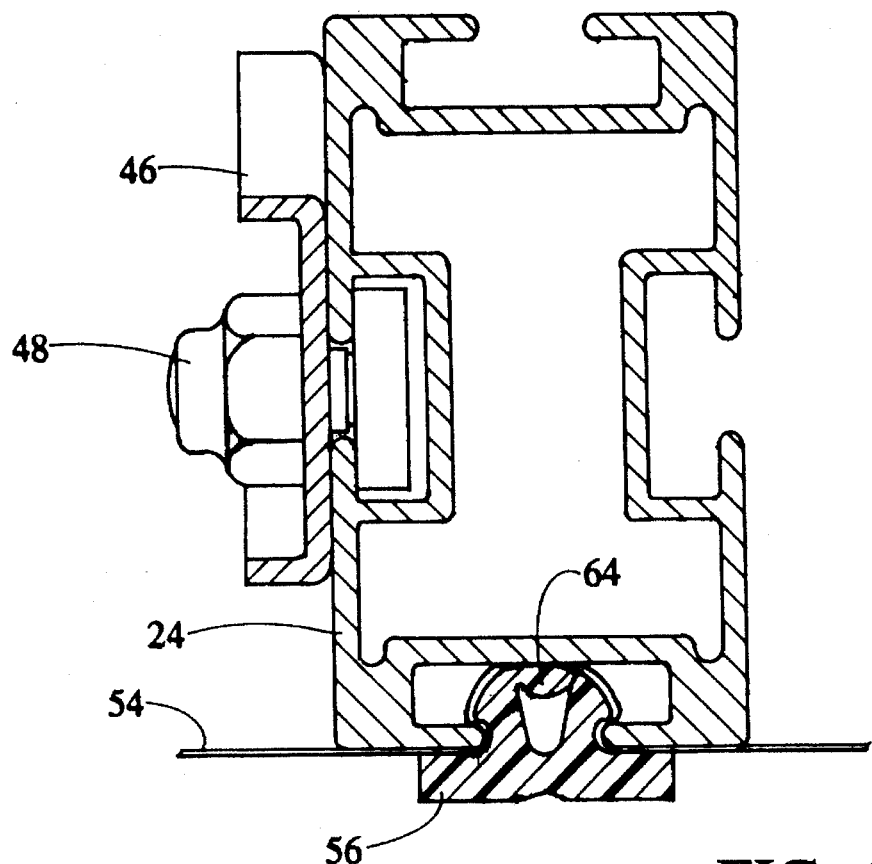
FIG. 8 is a cross sectional view, to a very large scale, through a main structural member and showing part of a bracing means and sheet holding members.

To assemble each of the sheets 52 and 54 into position, each sheet is rolled out across the completed wall and roof structure of the greenhouse and the sheet holding members 56 are progressively inserted into the grooves 27 of the members 24 and 26 to press the sheet into the grooves to retain the sheet in its desired location. Pressing each sheet into its grooves 27 tends to tighten the sheet between the grooves so as to hold the sheets apart in the span between the grooves. Each member 56 is constructed with a longitudinal recess 70 at the base of each leg 60 and 62. To insert each of the members 56, the legs 60 and 62 are caused to move towards each other as they are inserted through the narrow openings 32 to the grooves 27 by engagement of inclined outer surfaces 72 of the legs with the edges of the lips 34 of the structural members. As the legs pass into the grooves 27, the free end portion 64 of the member 56 engages the flat base surface of the groove and, as insertion continues, the portion 64 is forced to pivot about the neck 66 so as to engage the opposite leg 60 thereby forcing this leg away from the leg 62. The undersurface 74 of each of the free end portions 64 is convex so as to enable the portion 64 to slide upon the base surface of the groove as it is being pivoted. In the finished assembly position, as shown by FIG. 8, in each of the members 56 the free end portion 64 has been forced upwardly to force and hold apart the two legs 60 and 62 and in this position the lips 34 are received within the recesses 70. The free end portion 64 acting against the base of the groove causes the legs to be gripped between the lips 34 and the groove base and the corresponding one of the sheets 52 and 54 trapped by the legs 60 and 62 within the groove. Members 56 are thus positively held in their inserted positions to retain the enclosure sheets 52 and 54 securely in position.

Figure 8A:
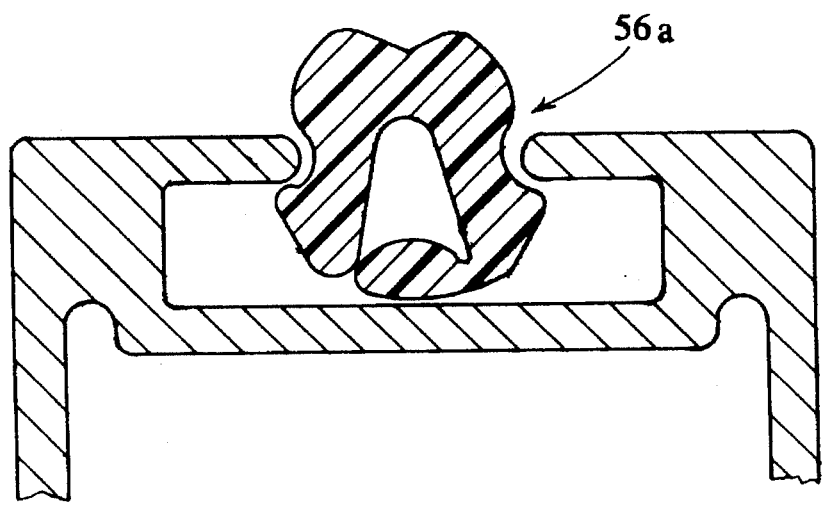
FIG. 8a is a scrap view comparable to FIG. 8 of a modification to part of the structure of the first embodiment.

The planar base 58 of each member 56 is not instrumental in holding the sheet 52 or 54 in position, but merely covers the opening 32 of its groove 27 for aesthetic reasons. It could be omitted, as exemplified by FIG. 8a in which member 56a has laterally extending planar base 58 omitted.

As may be seen from FIGS. 6 and 7, the ends of the structures 20 and 22 diverge from the position of the hinge in the assembled condition. To prevent the outer enclosure sheet 52 from being cut at the "eave" and ridge corners at the ends of the main structural members in these widening gaps positions, convex-shaped members in the form of elongate plastic foam members 76 are disposed within each of the gaps with their outer convex surfaces projecting outwardly from the gaps. Thus, when the sheet 52 is in position it extends around the convex surface of each of the members 76 and is held away from the corners of the main structural members which could cause damage to the sheet. Also, the locations of the bracing members 46 and 47, bridging structural members 45 and 49 and the hinges do not present any obstacle to the location to the inner enclosure sheet 54 around the greenhouse structure. For instance as shown by FIGS. 6a, 6b and 7, the inner enclosure sheet 54 extends towards each of the hinges 42 but upon reaching a bridging structural member 45 or 49, the sheet extends along the inwardly facing surface of the bracing member 45 and 49 from one structure 20 or 22 to another and is held in position within the inwardly facing groove 27 of the member 45 or 49 by a sheet holding member 56 (FIG. 6b). As a result, the inner enclosure sheet 54 does not approach any hinge position but spans across the hinge position between the structural members as dictated by the positions of the bracing members 46.

Figure 9:
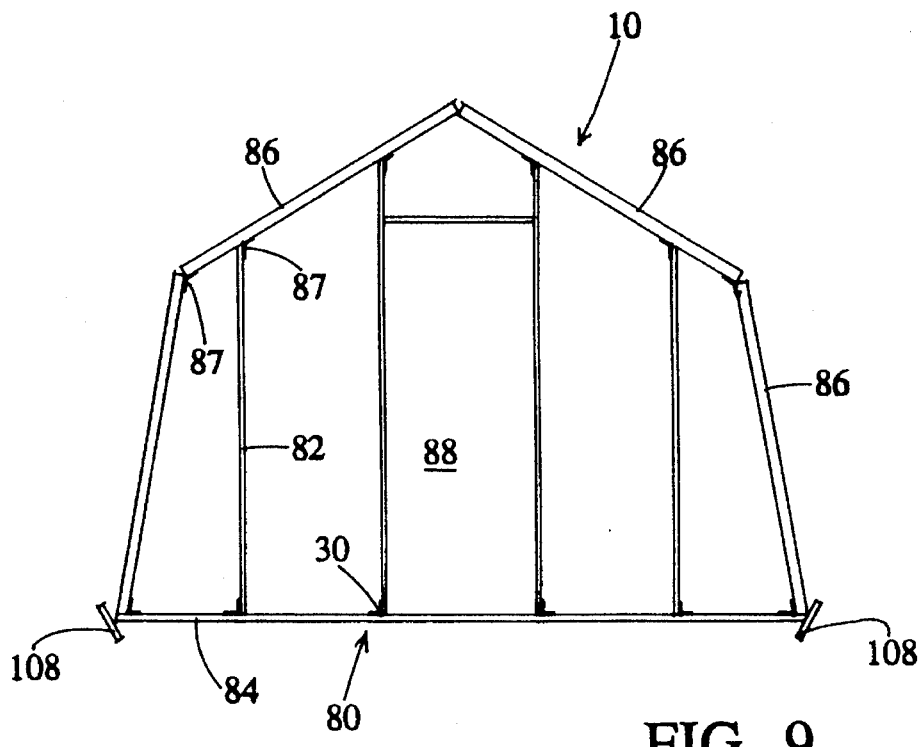
FIG. 9 is a view of one end of the greenhouse.

Each of the front and rear ends of the greenhouse may then be constructed. The front end 16 only is shown in FIGS. 1 and 9 with the understanding that the rear end is basically similarly constructed to the front end. The front end 16 of the greenhouse is constructed of vertical rigid structural members 82 of required lengths, a main rigid horizontal ground structural member 84 and inclined structural members 86 which correspond in angle to the angles of the wall and roof structures 20 and 22 of the assemblies 12. The structural members of the front end 16 are of the same cross sectional shape and size as the members 24 and 26 described above. The structural members of the end 9 are held together, as shown partly diagrammatically in FIG. 9 by securing means comprising brackets, similar to the brackets 30 shown in FIG. 2, and screw-threading means for reception in the appropriate T-grooves of the structural members. Some of the brackets for holding the members 82, 84, 86 together are right-angled brackets 30 but the angle of other brackets 87 is obtuse and may be as required for securing the members 86 to each other and to the vertical members 82. For convenience, and to avoid the need for obtuse angle brackets 87, hinges may be used instead. A door (not shown) to be fitted into an opening 88 positioned centrally in the front end 9 is also constructed of structural members of the same shape and dimensions as members 24 and 26. Upon completion of each end of the greenhouse structure, end enclosure sheets 90 and 92 (FIG. 10) on the inside and outside are located and are held in position by holding members 56 received in appropriate grooves 27 in the manner described above for the walls and roof structure.

Figure 10:
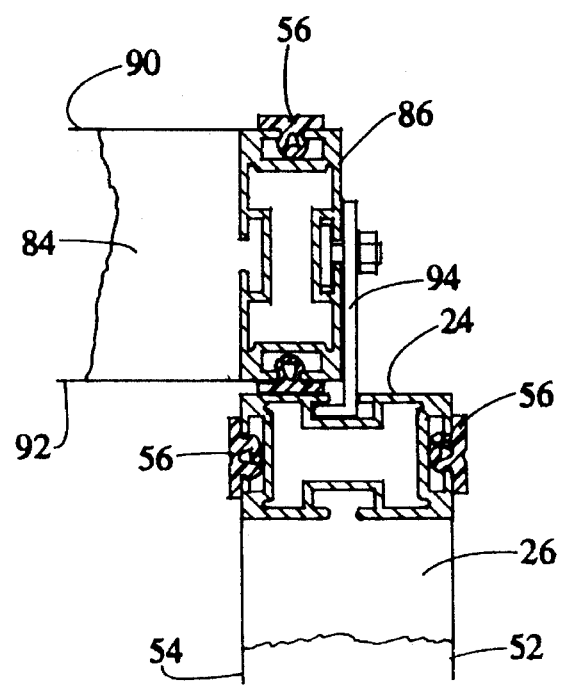
FIG. 10 is a cross sectional view illustrating the assembly of the end of the greenhouse to erected sub-assemblies which form the side walls and the roof.

Upon completion of the front end 16, it is attached to the appropriate end of the side and roof structure as shown by FIG. 10. In its correct location the end 16 is abutted against main members 24 of the wall and roof structures 20, 22 with the sheet holding members 56 on the inside of the end 16 sandwiched against the main members 22 for sealing purposes and L-shaped brackets 94 are secured between the end grooves 28 of the main structural members 22 and 86.

Opening vents may be provided (not shown) as desired in either an end of the greenhouse structure or in a wall or roof structure 20 or 22. In any case where a vent is provided, the structural members of the greenhouse structure around the vent opening are provided with grooves similar to grooves 27 to secure the enclosure sheets 52 and 54 in position around openings in the sheets to receive the opening vents. The structures of the vents are formed by frames of similar section to the structural members 24 to permit inner and outer closure sheets to be secured thereto in a manner similar to the securing of the enclosure sheets 52 and 54 to the greenhouse structure.

As may be seen from the first embodiment therefore, rigid elongate structural members of the described shape having a groove in each of its four sides may be used extensively through the structure of the greenhouse thereby minimizing the variety of parts which are necessary for the structure. In addition to this, the shape of the rigid structural member enables complete structural units to be assembled before enclosure sheets are placed into position and also allows for the use of two spaced-apart enclosure sheets to be located upon, and one on each side of, the already assembled structure. The greenhouse is itself easy to assemble, particularly when pre-built structural assemblies 12 have been prepared, and these assemblies are advantageous both for storage and transport purposes and are easily erected into their final use positions with suitable securing bracket means. Also, in a case where the grooves are all the same size and shape this enables the sheet holding members and screw-threaded securing means to be located as required in any of the grooves for assembly purposes dependent upon the type of structure which is required.

Figure 13:
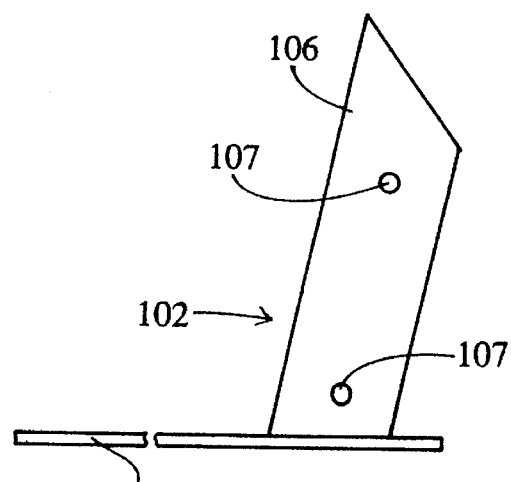
FIG. 13 is a side elevational view of an anchoring link for use in anchoring the greenhouse to the ground.
Figure 14:
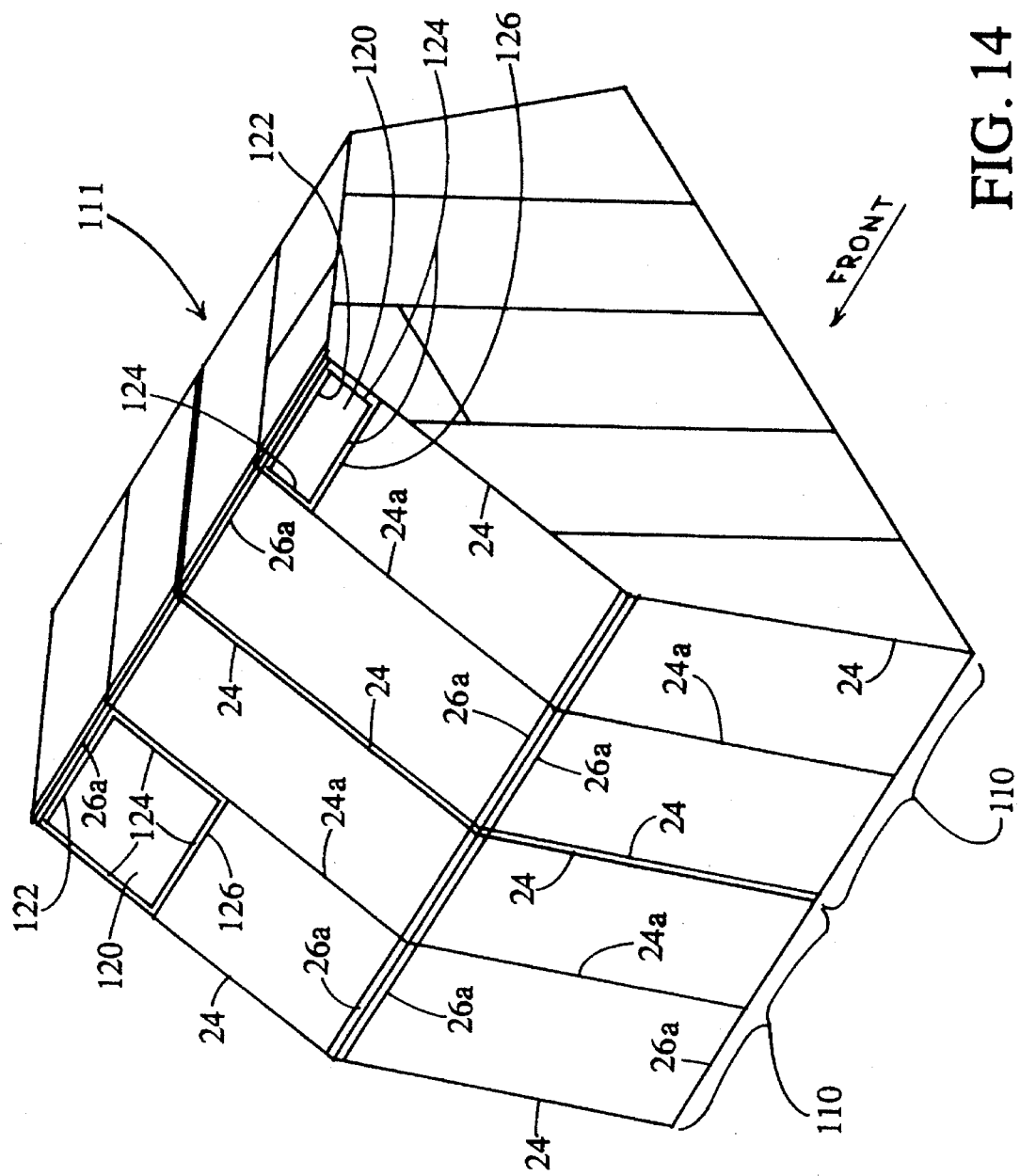
FIG. 14 is view similar to FIG. 1 of a second embodiment.

In the first embodiment as shown, the structural members have been extruded as hollow sections thereby minimizing their weight and this produces a central longitudinal cavity 100 (see FIG. 2) which is extremely useful for anchoring the structure to the ground. For instance as shown by FIG. 13, an anchor structure 102 may be used which has a flat ground plate 104 held by filled sandbags in position upon the ground. The plate 104 supports a rigid peg 106 which is inclined at the required angle to be a sliding fit within an appropriate cavity 100 of a main structural member 24 of a wall structure 20 of the structural assembly 12. The structural members 24 of the wall structures 20 are each provided with two holes (not shown) passing from side-to-side for alignment with lateral holes 107 in an associated peg 106 to enable securing bolts to pass therethrough to secure the greenhouse structure to the ground. As an alternative to bolts, holding pins are forced through the aligned holes.

In alternative arrangements of bracket structures, pegs 106 are attached to other base designs for securing to wooden platforms or even to a tubular structure (e.g. inclined tubes 108 in FIG. 9) for accommodating spikes which are driven into the ground for holding purposes.

Structural members according to the invention and having a groove on each of its four sides may be used to construct a building of any desired size and shape to have two spaced enclosure sheets to provide a double glazing effect. This is shown by the following embodiments for greenhouse structures and which may also use front and rear end structures of the same design as in the first embodiment.

Figure 15:
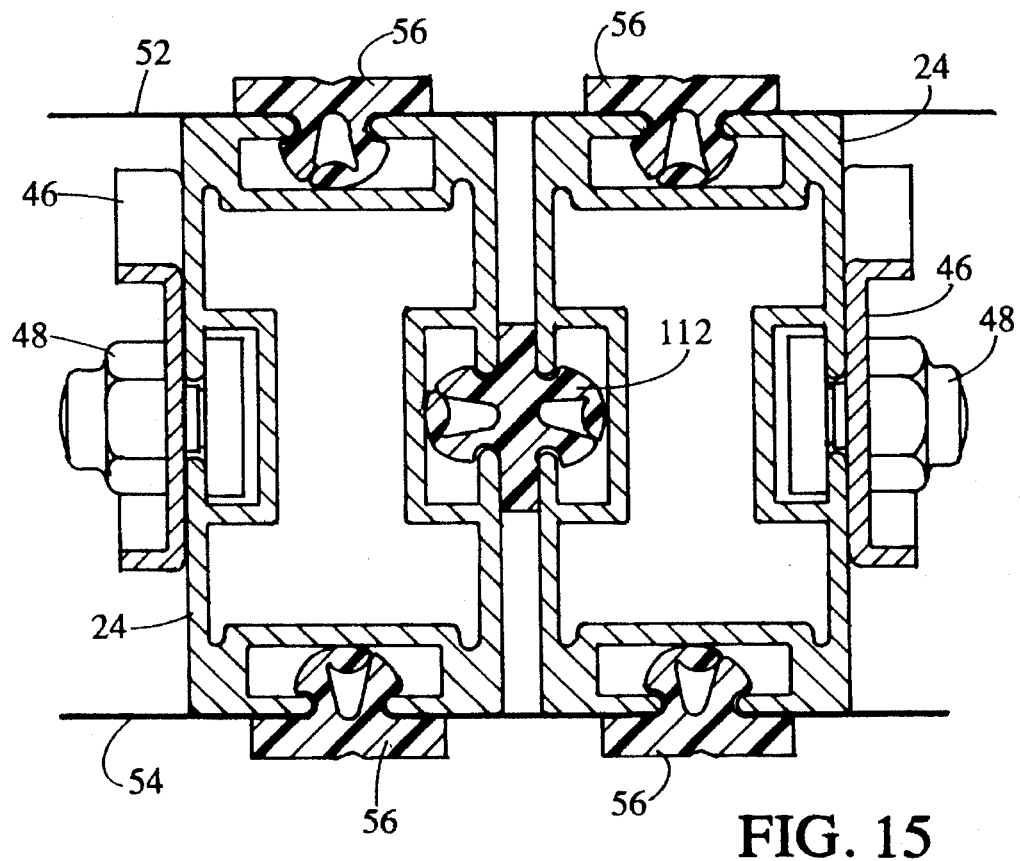
FIG. 15 is a cross sectional view through two main structural members showing the members assembled together in the second embodiment.
Figure 16:
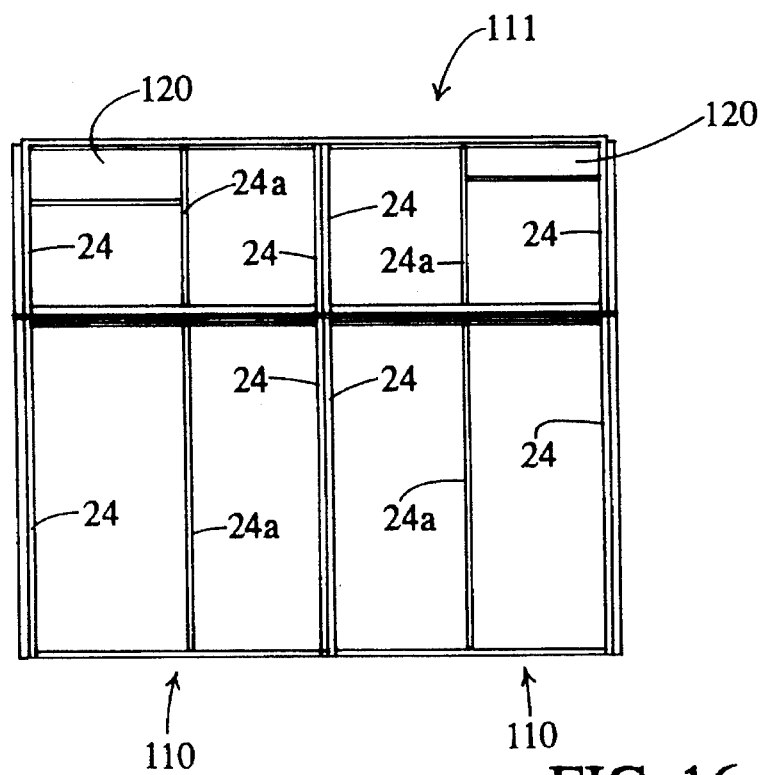
FIG. 16 is a side elevational view of the structure of the second embodiment.
Figure 17:
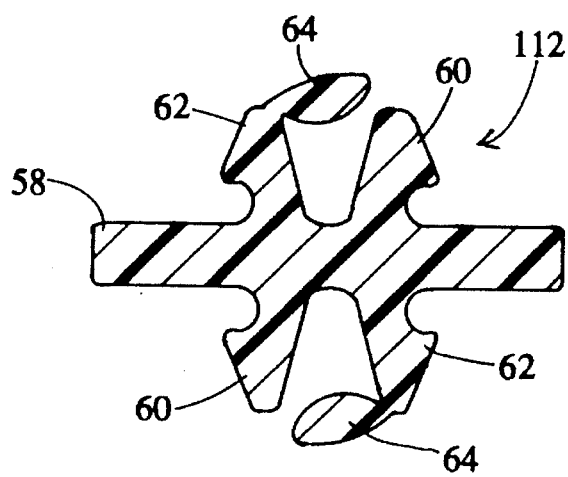
FIG. 17 is a cross sectional view of a holding member for holding two main structural members together in the structure of the second embodiment.

In a second embodiment as shown in FIGS. 14 to 17, two complete structural assemblies 110 (FIG. 14 and 16), of width greater than the assemblies 12 in the first embodiment, are secured together to form wall and roof structures for a greenhouse 111 which is longer than in the first embodiment. Each assembly 110 comprises main structural members 24 at the sides of the assembly and intermediate structural members 24a parallel to and equidistant between the members 24 (see FIG. 16 for greater detail). Secondary elongate rigid members 26a extend between main structural members 24 with the members 24a abutted against the members 26a. The rigid members 26a are hinged together in each assembly 110 in a similar manner to that in each assembly 12 of the first embodiment. This is useful, for storage, transport and erection purposes a discussed for the assemblies 12 in the first embodiment. Main structural members 24 of assemblies 110 abut and are secured together by a structural holding member 112 such as is shown in FIGS. 15 and 17. This structural holding member 112 is basically of the same structure as the sheet holding member 56 described in the above embodiment except that it has two pairs of legs 60 and 62 extending one pair from each side of the base 58. In this case, as may be seen, the legs 60 and 62 at each side of the base are inserted within the appropriate grooves 28 and are held apart by the locking free end portion 64 in that groove to retain the holding member in position and therefore hold the main structural members assembled together.

FIG. 15 also shows parts of two bracing members 46 held in position by a nut and bolt assembly 48 and the location of the sheet retaining members 56 for holding the inner and outer enclosure sheets 52 and 54 as they extend across the completed structure.

The sheet holding members 56 may also be used for additional purposes (not shown) such as for supporting screws inserted through the bases 58 of the holding members for the purpose of holding brackets, light fixtures, baskets, or other items without actually puncturing the enclosure sheet which the holding member retains in place.

In the second embodiment, two roof vents are shown (FIG. 14) of different size. Each vent is provided by an opening window 120 having a frame member 122 hinged to a respective rigid member 26a of the greenhouse and three other frame members 124 to provide a rectangular shape to the window. Each window opening is partly defined by structural members 24 and 24a and a short structural member 126 extending between members 24 and 24a. The structural members 126 and the frame members 122 and 124 are of the same cross-sectional shape as the members 24 and 24a. Hence grooves in the structural members 126 cradle the enclosure sheets of the greenhouse to be secured in position around the window openings. Also, grooves in the frame members 122 and 124 permit inner and outer closure sheets to be secured thereto in a similar manner.

Figure 18:
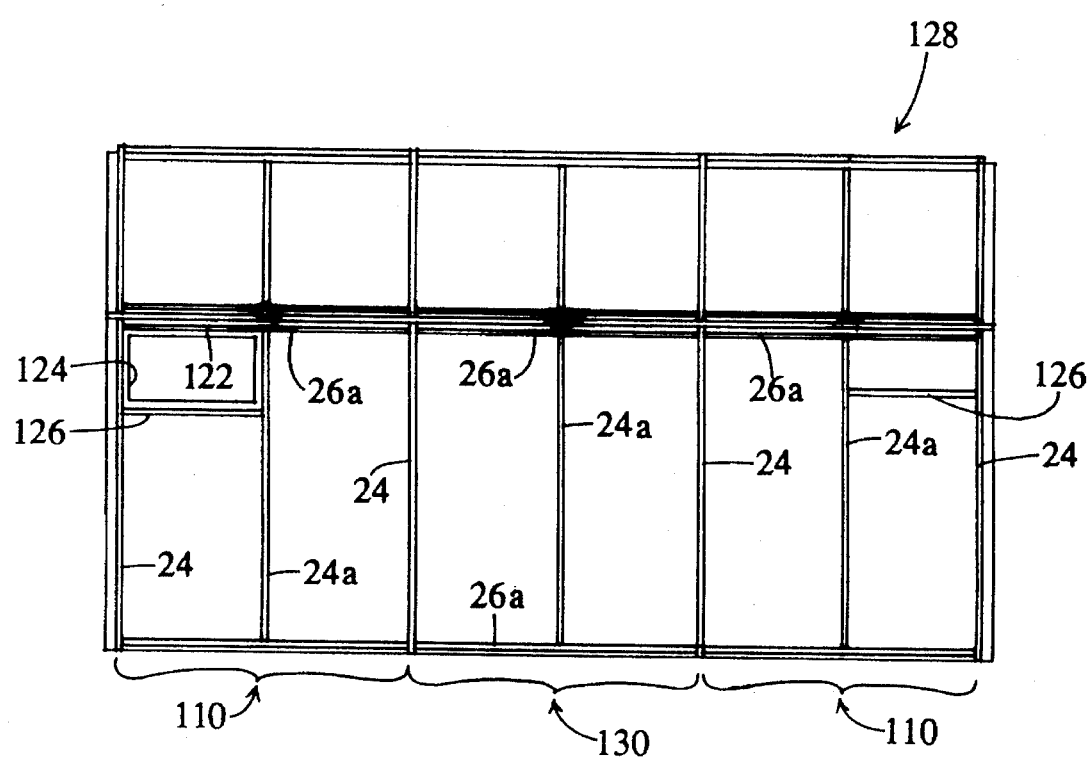
FIG. 18 is a side elevational view of a building structure according to a third embodiment.
Figure 19:
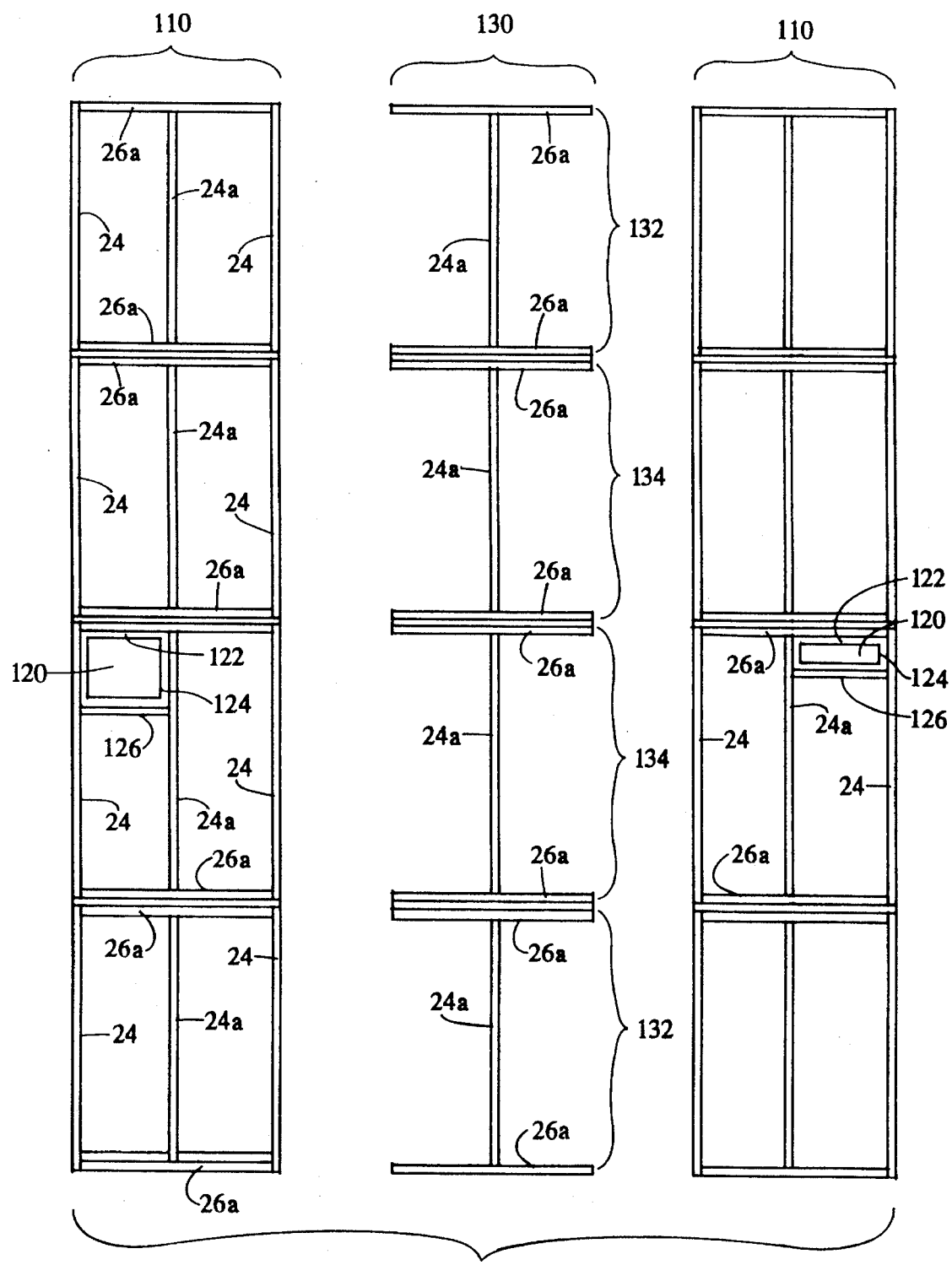
FIG. 19 is a diagrammatic plan view, in exploded condition, of structural assemblies to make the structure of the third embodiment.

In a third embodiment, a building structure 128 is larger than that of the second embodiment. The wall and roof of the building structure 128 is constructed from two complete structural assemblies 110 (FIGS. 18 and 19) as in the second embodiment, and a structural assembly 130 located between and connecting together the assemblies 110. FIG. 19 shows the assemblies 110 and 130 in planar collapsed condition. As indicated in the second embodiment, the rigid members 26a of the assemblies 110 are hinged together to enable the assemblies to be formed into the erected condition. This is in a manner similar to that described in the first embodiment, using bridging members 45 and 49 and brace members 46 and 47 (bridging and brace members not shown in the third embodiment). The assembly 130 is then located between the assemblies 110 while it is being erected and is secured to each assembly 110. As shown by FIG. 19, the assembly 130 comprises wall and roof structures 132 and 134 each of which is provided by two structural members 26a spaced apart laterally by a structural member 24a to form an 'I' shape in plan view. The structural members 26a are hinged together between adjacent wall and roof structure so that the assembly 130 may also be supplied to site in planar collapsed condition as shown by FIG. 19. While the assembly 130 is being erected it is secured to the assemblies 110 by securing the structural members 26a to the structural members 24 at ends of the assemblies 110 which are adjacent to the assembly 130. This securement is provided by L-shape brackets 30 as described above with reference to the first embodiment and FIG. 2. FIGS. 18 and 19 also shown the use of two vents provided by opening window 120 as described in the second embodiment.

In a modification to the third embodiment, the roof and wall structures of structural assembly 130 are not preassembled together, but are supplied separately and are attached individually to the two assemblies 110.

As may be seen from the above embodiments, building structures may be made of different sizes while employing a minimum number of different sizes of structural members which are all of the same cross-sectional shape and have grooves extending along each side. The three embodiments described show three greenhouse structures of different lengths which use the same design of front and rear ends. As discussed, a double glazing effect is easily provided and opening windows to provide vents also are provided with a double glazing effect.

Structures according to the invention may be used for purposes other than for greenhouses, such as for sheds, living accommodations or even for tents, possibly for use in cool climates. In such situations, the enclosure sheet material may be opaque and stronger than the enclosure sheet material for greenhouse use. In addition, thermal insulation may be installed between the face-to-face spaced apart enclosure sheets.

With the above considerations in mind, reference is made to a fourth embodiment in FIG. 20 in which a greenhouse structure 128 is built of the same structural assemblies as in the second embodiment. Accordingly, where two structural assemblies meet, main structural members 24 abut each other and are secured together by a structural holding member 112. The fourth embodiment differs from the second embodiment in that the sheet holding members 56 are replaced by holding members 130 which are both sheet and panel holding members. Each panel holding member 130 has two legs 60 and 62 and a locking portion 64 of the same construction and operation as in the members 56. However, the legs 60 and 62 extend from a long neck 132 which projects from the respective structural member 24 to terminate in a flat planar base 134 extending from each side of the long neck 132 to form a T-shape with the neck. The base 134 is spaced a specific distance from the respective member 24 so as to hold, between the base 134 and the structural member 24, respective edges of rigid or semirigid panels 136 and 138 which are thus assembled to the structure 128 between adjacent holding members 130.

Hence, the outer and inner enclosure sheets 52 and 54 are held in position over the greenhouse structure 128 by being pressed into the grooves 27 by insertion of the sheet holding members 130 into the grooves in the manner described above. In normal use as a greenhouse, the sheets 52 and 54 are exposed as described in the preceding embodiments and the long necks 132 of the holding members 130 extend outwards from the structural members 124 with the bases 134 spaced from the structural members. However, should it be required to cover the whole of the structure with either the panels 136 or panels 138 or combinations of these panels, then holding members 130 are removed progressively across the structure to enable the panels 136 or 138 to be located in position overlying either or both of the enclosure sheets 52 and 54, the holding members 130 then being progressively replaced. It should be noted that only sufficient of the holding members 130 are removed at any particular time to allow for addition of specific panels 136 or 138 at that particular time. Hence, the sheets 52 and 54 are retained upon the greenhouse structure during this procedure.

Circumstances which may call for the addition of panels 136 or 138 include providing protection of the enclosure sheets 52 and 54 from severe weather conditions, such as ice formation or hail, or for the purpose of providing thermal insulation to the inside of the greenhouse upon an undesirable drop, or increase, in ambient temperature. The panels could then be reflective.

It should be borne in mind that each of the panels 136 and 138 is of a size sufficient only to extend across between successive holding members 130 as it is envisaged that the panels are totally planar and each may only extend across planar areas.

The structure of each of the panels 136 and 138 is dependent upon its intended use. For instance, each panel 136 is a solid non-perforate and non-cellular panel formed of any suitable material for outside usage, e.g. plastic materials, which include acrylic and polycarbonate materials and fiberglass reinforced materials, polyvinylchloride, and wood which may be structured into plywood panels and suitably treated, especially for outdoor usage.

On the other hand, each panel 138 is composed as a structural panel having ribs defining internal passageways or chambers 140 which are suitable for insulation purposes.

As alternatives for insulation purposes, rigid panels (not shown) may be formed with internal closed cells and have a skin on each side of each panel devoid of cells. Each of these latter panels may be formed in known manner for cellular structures by admitting an expansible gas into molten plastic in an extruder, the gas expanding upon the release of extrusion pressure, after extrusion, to form the closed cell structure.

In a modification (not shown) of the fourth embodiment, the structure is formed, not as a greenhouse, but as a shed or some form of living accommodation (perhaps temporary). In this case the enclosure sheets 52 and 54 are omitted and panels 136 or 138 or similar panels suitable for the actual requirements are installed initially directly onto the structure by the holding members 130 which in this case are just panel holding members. In this case, with panels on both the inside and outside of the structure and spaced apart by the structural members 24 and 26, thermal insulation of any suitable type (e.g. closed cellular form or fibreglass) may be located between the spaced panels.

In a further modification of the fourth embodiment (FIG. 21), certain of the holding members 130 are replaced by holding members 142 having a stepped base, one side 144 of which is located in a position relative to the legs 60 and 62 similar to the base 58 of the holding members 56 and the other side 146 is located in a position relative to legs 60 and 62 similar to the base 134 of members 130. In this case, inner and outer enclosure sheets 52, 54 may be incorporated to terminate at the holding members 142 and held within the associated grooves 27 while being engaged by the one side 144 of the base of a holding member 142. A panel 136 or 138 (136 being shown) extends from beneath the other side 146 of the base of holding member 142 to be held in place as described in the fourth embodiment.

Figure 22:
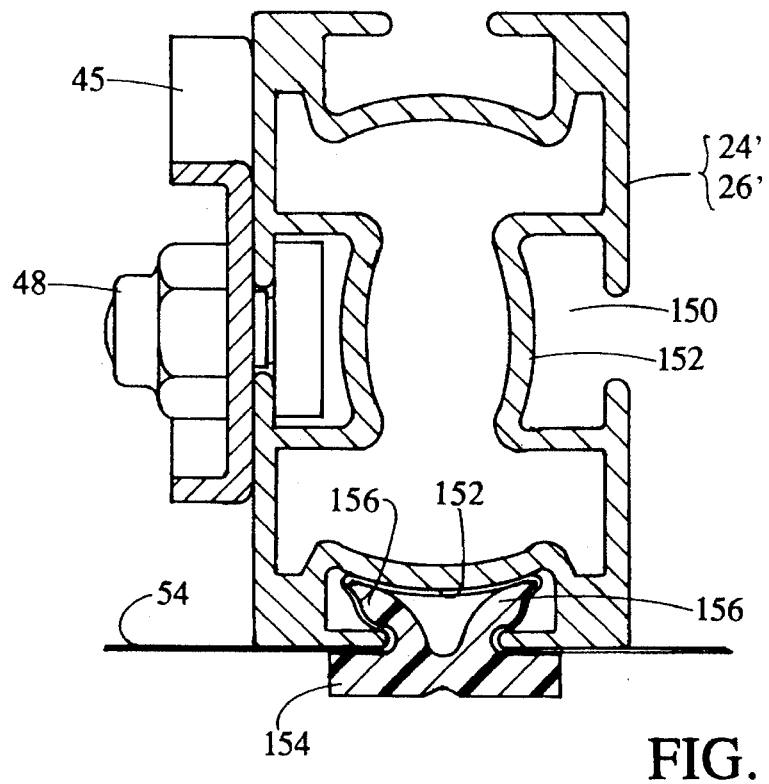
FIG. 22 is a view similar to FIG. 8 of a fifth embodiment.

In a fifth embodiment, as shown in FIG. 22, structural members 24' and 26' have T-shaped grooves 150 of different shape from the grooves 27 and 28 of the other embodiments. In this modification, a bottom surface 152 of each groove is convex in lateral cross-section. For use with these grooves 150, sheet holding members 154 are used. These members 154 differ from the holding members 56 in that each member 154 has two splayed apart legs 156, but no locking free end portion (i.e. similar to portion 64) is included. In this modification, the legs 156 are shaped such that upon being inserted in a groove 150, they engage the convex surface 152 of the groove and are forced further apart by the groove surface as insertion continues. The ends of the legs then are held extended towards or into the corners of the groove to resist removal of each holding member 154.

Figure 23:
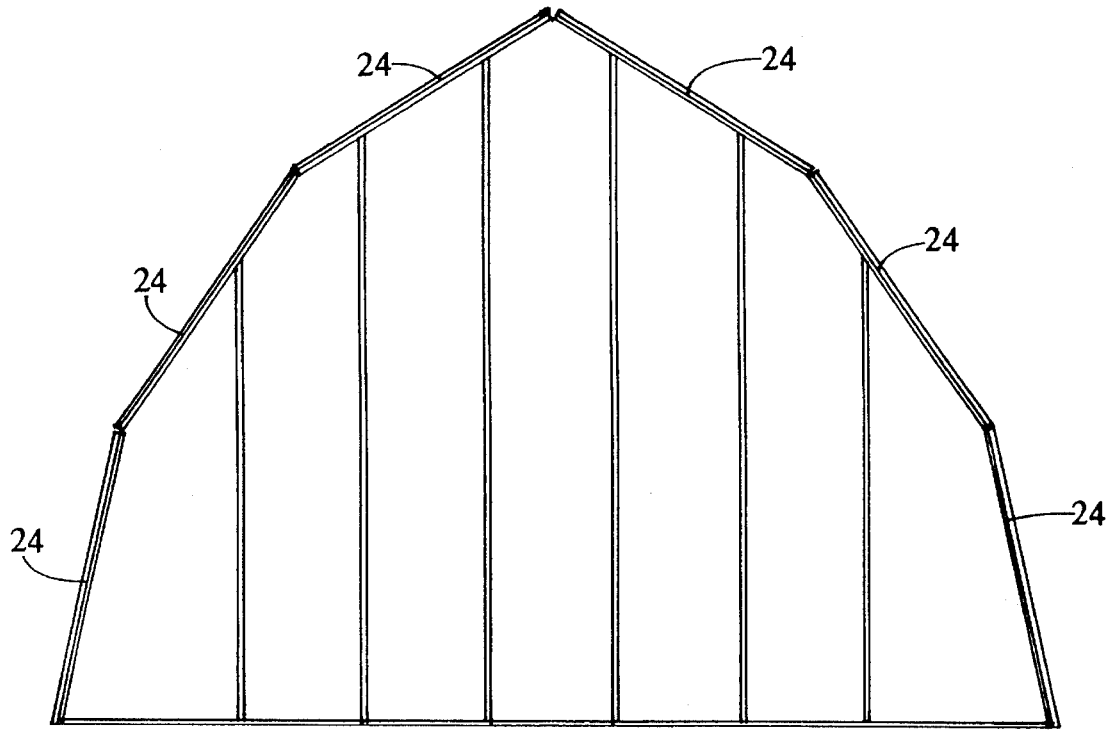
FIG. 23 shows a modification.

In modifications (such as shown in FIG. 23) of the embodiments, structural assemblies 12, 110 and 130 are replaced by other hinged structural assemblies. In certain of these modifications, buildings are larger than the greenhouses of the embodiments and require structural assemblies with more than four structures (such as structures 20 and 22) in series connected by hinges. For instance, as illustrated in FIG. 21, it is possible to provide a structural assembly having two wall structures at ends of a structural series in which three, four or more roof structures are disposed between the wall structures. In erected condition of such a structural assembly according to a modification, the angles of the planes of the structures 20 and 22 change from structure to structure in the series.

In further modifications (such as shown in FIG. 23) structural assemblies comprise a series of elongate rigid side structural members 24, three per side being shown, which are hinged together in a structural assembly to be disposed in a collapsed or erected condition. Structural assemblies of these particular modifications may be stored or transported to a building site in the collapsed condition, thus occupying minimum space. The structural assemblies formed solely of hinged-together structural members 24 are easily, conveniently and quickly erected into position and the structural members 26 are then located between them and secured in position to form a building structure. In addition, the number of members 24 which are disposed in series is dependent upon the size of building for which a completed structural assembly is required.

It should be noted that, in any of the above embodiments or modifications thereof, because of the structural design, it is possible to remove either one or both ends of the structure for any required purpose. For instance, in the greenhouse structures, removal of one and perhaps both ends will allow for young plants to become acclimatised to ambient temperature conditions before removing the plants from within the greenhouse for outside planting purposes. Alternatively, when structures other than greenhouses are built, removal of an end of each structure may be required for loading in and stacking of certain articles (particularly large articles too big for the doorway). The end may then be replaced if desired.

It should be appreciated that the present invention is not limited to greenhouses but embraces structures for a variety of purposes, such as temporary shelters for people, for boats, boat dock covers, and so on.

What is claimed is:

1. A structural assembly for a building comprising two wall structures and two roof structures, each structure comprising two main elongate rigid side structural members each having four sides, each side formed with a groove extending longitudinally of the member, each member also having lip means defining a narrow opening to each of the grooves, and the two main elongate rigid side structural members are located at the sides of the structure and are held spaced apart by secondary elongate rigid structural members extending between and secured to the main structural members with two of the grooves of each main member provided in oppositely outwardly facing sides of the structure to provide sheet retaining grooves for releasably accepting sheet holding members for securing within the retaining grooves two flexible enclosure sheets extending in face-to-face relationship across the two opposite sides of the structure, and the structures are hinged together in series as an assembly with the two wall structures at ends of the series and separated by the two roof structures, the structures being relatively movable about hinged positions between an erected state of the assembly and a collapsed state of the assembly.

2. An assembly according to claim 1 wherein each secondary structural member also has four sides each of which is formed with a groove extending longitudinally of the member and lip means are provided to define a narrow opening to each groove of each secondary member, and in each structure each secondary member is secured in abutting relationship to its associated main structural members with two of the grooves of each secondary member provided in two oppositely outwardly facing sides of the structure and securing means is provided and which secures each secondary member to its associated main member by reception of a screw threaded means into grooves of the main and secondary members which face inwardly of the structure and are provided in sides extending between the two oppositely outwardly facing sides of the main and secondary members.

3. An assembly according to claim 2, wherein each securing means comprises a rigid bracket and the screw-threaded means secures each bracket to a main and associated secondary members.

4. An assembly according to claim 2, wherein in cross section, the main and secondary structural members are of the same shape and are of equal dimensions.

5. An assembly according to claim 2, wherein each of the grooves of the main and secondary structural members is of T-shape in cross section, the narrow opening extending inwardly as a narrow passage to form the leg of the T-shape and terminating at a base of the groove which provides the cross section of the T-shape of the groove.

6. An assembly according to claim 4, including bracing means for holding the assembly in erected state with adjacent structures of the series held in specific relative angular hinged positions, each bracing means comprising a rigid bracing member to extend from structure to structure to be held in position by screw-threaded means receivable in a groove in each of the two main structural members of adjacent structures.

7. An assembly according to claim 6, wherein each screw-threaded means for a bracing member is receivable within a groove provided in a side of the main structural member which extends between the two oppositely outwardly facing sides.

8. An assembly according to claim 1, wherein in the erected state the main structural members in adjacent structures have adjacent ends which diverge to form widening gaps from the hinge positions, and a convexly-surfaced member is provided for location within each gap with its convex surface projecting outwards from the gap to protect an enclosure sheet from corners at the adjacent ends of the structural members where the sheet extends from structure to structure in the assembly and over the convexly shaped member.

9. An assembly according to claim 8, wherein the convexly-shaped member is elongate to extend from side to side of the assembly.

10. An assembly according to claim 9, wherein the convexly-shaped member is formed from plastic foam.

11. An assembly according to claim 1, including a plurality of sheet holding members for securing, within the sheet retaining grooves of each of the main structural members, two flexible building enclosure sheets to extend in face-to-face spaced apart relationship on opposite sides of each structure.

12. An assembly according to claim 11, wherein each sheet holding member is elongate and comprises a base and two legs extending in laterally spaced relationship from the base, the legs being relatively flexibly movable towards each other or apart, one of the legs having a locking free end portion which is flexible upon its associated leg, and in the normal position, is inclined in a direction generally towards the other leg, the legs being insertable, in positions moved towards each other, through the narrow opening into a sheet retaining groove and, during insertion, a locking free end portion is engagable with a surface of the groove to cause deflection of the end portion from the normal position and apply pressure to the other leg and hold the legs apart to retain the legs within the groove.

13. An assembly according to claim 12, wherein the locking free end portion has a narrow neck connected to its associated leg, the neck providing a flexing action for the locking free end portion which, from the neck to its free end, is substantially rigid so as to apply pressure to hold the legs apart until the locking free end portion is returned to its normal position.

14. An assembly according to claim 13, wherein the locking free end portion has a concave surface facing away from the base of the sheet holding member to facilitate a sliding movement upon the surface of its associating groove during the flexing of the neck to move the locking free end portion out of its normal position.

15. A holding member for insertion into a groove of a rigid structural member comprising a base and two legs extending in laterally spaced relationship away from the base, the legs being relatively flexibly movable towards each other or apart, one of the legs having a locking free end portion which is flexible upon its associated leg and in a normal position is inclined in a direction generally towards the other leg, the legs being insertable in positions moved toward each other through a narrow opening and into the groove and, during insertion, the locking free end portion is engagable with a surface of the groove to cause deflection of the free end portion from the normal position and apply pressure to the other leg and hold the legs apart to retain the legs within the groove.

16. A holding member according to claim 15, wherein the locking free end portion has a narrow neck connected to its associated leg, the neck providing a flexing action for the locking free end portion which, from the neck to its free end, is substantially rigid so as to apply pressure to hold the legs apart until the locking free end portion is returned to its normal position.

17. A holding member according to claim 16, wherein the locking free end portion has a concave surface facing in a direction away from the base to facilitate a sliding movement upon the surface of the groove during the flexing of the neck to move the locking free end portion out of its normal position.

18. A kit comprising a plurality of building sections, each building section formed by four elongate rigid structural members each having four sides each of which is formed with a groove extending longitudinally of the member, the member also having lip means defining a narrow opening to each of the grooves, the four structural members of each section hinged together end to end for folding flat for transport and storage, and for unfolding to form a pair of upright members and a pair of roof members, and a plurality of spacers and fastening means for interconnecting adjacent unfolded ones of said plurality of building sections in spaced relation to form a building structure.

19. A structural assembly for a building comprising two wall structures and two roof structures, each structure comprising two main elongate rigid side structural members each having four sides, each side formed with a groove extending longitudinally of the member, each member also having lip means defining a narrow opening to each of the grooves, and the two main elongate rigid side structural members are located at the sides of the structure and are held spaced apart by secondary elongate rigid structural members extending between and secured to the main structural members with two of the grooves of each main member provided in oppositely outwardly facing sides of the structure to provide grooves for releasably accepting panel holding members for mounting upon the structure two panels extending in face-to-face relationship across the two opposite sides of the structure, and the structures are hinged together in series as an assembly with the two wall structures at ends of the series and separated by the two roof structures, the structures being relatively movable about hinged positions between an erected state of the assembly and a collapsed state of the assembly.

20. An elongate rigid structural member having four sides, each of which is formed with a groove extending longitudinally of the member, the member also having lip means defining a narrow opening to each of the grooves, wherein each groove has a bottom surface which is convex in a lateral cross-section of the groove.

* * * * *